May 2, 1939. E. A. JOHNSTON ET AL 2,156,565
TORQUE BRACE FOR TRACK TYPE TRACTORS
Filed July 17, 1937
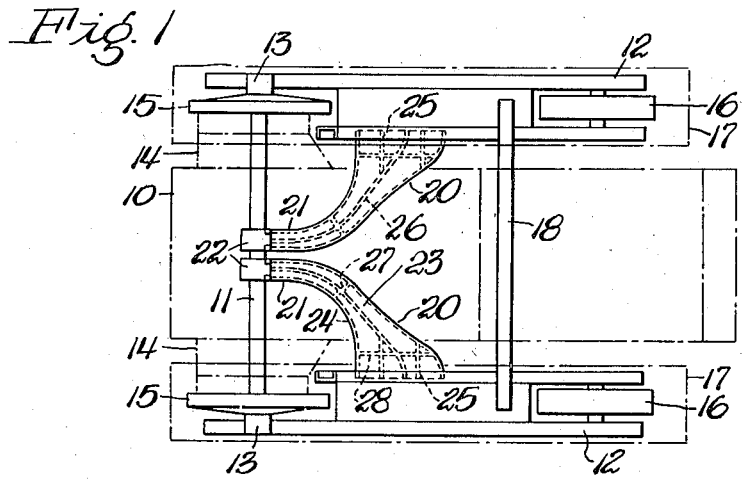
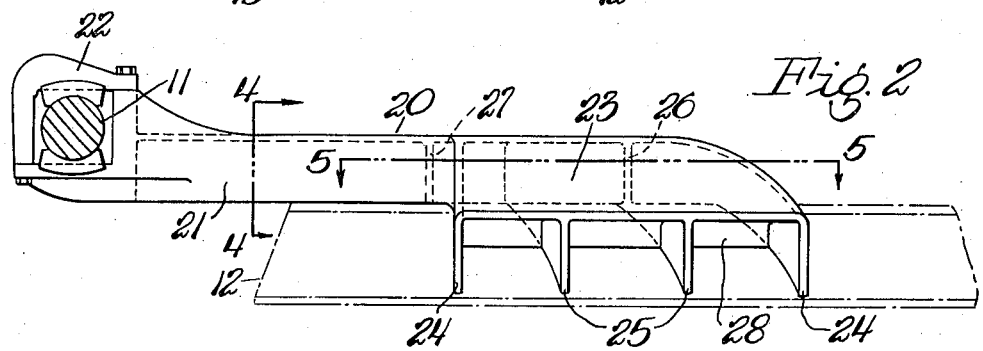
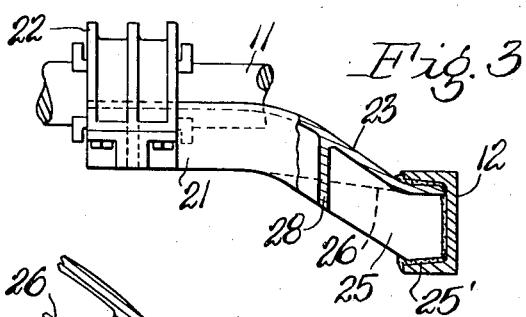
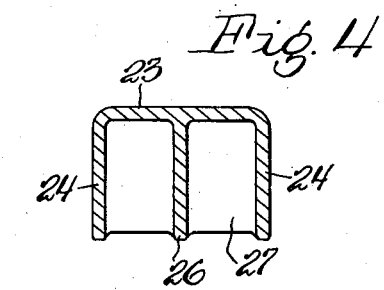
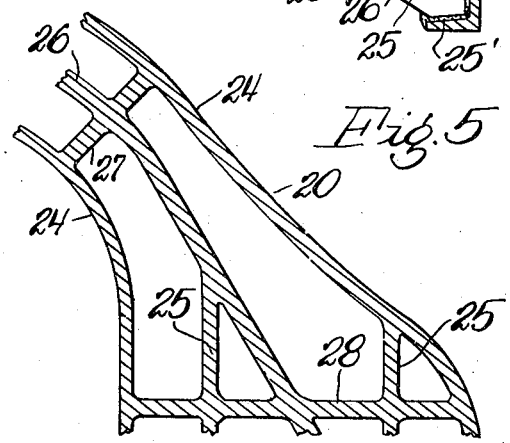
Inventors
Edward A. Johnston
Clifford R. Rogers
William O. Bechman
By V. F. Lasuegne
Atty.

Patented May 2, 1939

2,156,565

UNITED STATES PATENT OFFICE 2,156,565

TORQUE BRACE FOR TRACK TYPE TRACTORS

Edward A. Johnston, Chicago, Clifford R. Rogers, Oak Park, and William O. Bechman, Chicago, Ill., assignors to International Harvester Company, a corporation of New Jersey Application July 17, 1937, Serial No. 154,222

17 Claims. (Cl. 305—9)

This invention relates to a stabilizer torque brace for a track type tractor, and more particularly to an improved construction of the brace.

Common design in track type tractors necessitates the provision of a longitudinal main frame having side trucks disposed at the sides thereof for vertical oscillation or swinging movement with respect to the main frame. Ordinarily a transverse axle is provided near the rear end of the main frame, and projects at either side thereof. A track frame is movably carried at each end of this axle, and at its forward end, the main frame is supported on a transverse equalizer spring resting freely at each end on each track frame. This construction provides the well known three-point suspension and permits free vertical oscillation of the track frames relative to the main frame and independently of each other as the tractor operates over uneven terrain. Brace means in some form must be provided between the track frames and the transverse axle to maintain alignment of the track frames as the tractor operates over uneven ground. Particularly great stresses develop in the track frames when the tractor is steered, inasmuch as one track is held stationay while the other track is driven. A large amount of strain is developed on the track frame at the side of the stationary track and the entire weight of the tractor plus the driving power of the moving track is literally thrust against the opposite track frame. For this reason it is desirable to provide a sturdily constructed means to withstand such stresses and strains. The matter of providing a rigid torque control means becomes more apparent when the tractor is operated under adverse conditions. However, it is not desirable to provide a brace of this kind in which a great deal of weight is accumulated for reenforcing purposes, it being much more practicable to provide a light weight construction having enough rigidity to restrain torque and aid in maintaining the alignment of the track frames. It is also necessary that these brace means be so designed as to permit of easy manufacture without numerous complicated steps in processing the same.

However, an important problem arises in designing and manufacturing the torque brace inasmuch as the design of the tractor is such that the brace must be of such a size and shape as to permit of easy installation in the tractor. In the general type of tractor above referred to, the track frames are provided at the rear ends with a side member extending farther rearwardly than the opposite side member. The extending side member is provided with means for movably carrying the track frame on the transverse axle. The sprocket wheel of the tractor is carried on the transverse axle between the longitudinally extending main frame and the extending side member of the track frame, final drive mechanism therefor being positioned in a housing between the sprocket wheel and the main frame. The brace then, must be so designed and constructed as to accommodate the design of the tractor; that is, they must be shaped to be secured to the track frames and to the rear axle and yet fit around the final drive mechanism.

The principal object of the invention, therefore, is to provide an improved means for controlling the track frames of a track type tractor.

An important object is to provide an improved construction of torque control braces which renders them thoroughly capable of withstanding severe use.

Another important object is to provide such a construction which is comparatively simple to manufacture and which results in a sturdy and reliable structure.

Another important object is to facilitate fabrication of the brace by elimination of superfluous material and by proper distribution of reenforcing structure.

Another object specifically is to provide for casting the brace in an improved and simple manner by so designing the same as to eliminate coring, reenforced molds, and other complicated processing.

Another object is to provide such a brace in which provision is made for installation in a crawler tractor of the usual type without necessitating material alteration of the tractor.

Still another object is to provide such a brace formed substantially U-shaped in cross-section and having reenforcing ribs disposed therein at points of greatest torque stress.

Still another object is to provide a light weight torque brace generally triangular in plane to accommodate the design of the tractor and capable of entirely withstanding shock resulting from use under adverse conditions.

Still another object is to provide for improved securing of the brace to the track frames.

Still another object is to provide for the distribution of the reenforcing ribs in a manner providing additional points for securing the brace to a track frame.

Briefly and specifically, these and other objects are achieved by providing a torque brace generally of inverted U-shape in cross-section and substantially triangular in plane, being secured at its base to a track frame and, adjacent the apex thereof, to the transverse rear axle of the tractor. Reenforcing ribs are disposed in the brace at points of greatest stress, the reenforcing ribs adjacent the base of the brace providing spaced points for securing the same to the track frame.

Other objects and desirable features of the invention will be apparent from the following detailed description taken in conjunction with the accompanying sheet of drawings, in which:

Figure 1 is a plan view generally indicating the relationship between the tractor main frame, the rear axle, the track frames, and the brace means; the main frame, the final drive housing and the tracks being indicated in broken lines;

Figure 2 is an enlarged side elevational view of the brace showing the construction thereof and showing its connection to the rear axle, the position of the adjacent track frame being indicated in broken lines;

Figure 3 is a partial rear view of the brace with a portion thereof broken away and shown in section to show one of the reenforcing ribs thereof. This figure also shows the brace secured at one end to the axle and at the other end to the track frame;

Figure 4 is an enlarged section through the brace, showing the construction thereof, taken on the line 4—4 of Figure 2; and, Figure 5 is an enlarged, partial section taken on the line 5—5 of Figure 2, showing some of the reenforcing ribs in the brace.

The track type tractor shown in Figure 1 is generally of conventional construction and comprises a longitudinally extending main frame 10 having disposed adjacent the rear end thereof a transverse axle 11. At each outer end of the axle 11, a track frame 12 is movably carried, the outer frame member of each track frame being extended rearwardly and provided with a bracket 13 journaled on the axle 11. At each side of the main frame 10 and surrounding the axle 11, the tractor is provided with housings 14 containing the final drive mechanism, not shown, for a sprocket wheel 15 carried on the axle 13 inwardly of the rearwardly extending side frame member of the track frame 12. The forward end of each track frame 12 is bifurcated and carries between the side members thereof an idler wheel 16. An endless track 17 is trained about the sprocket wheel 15 and the idler wheel 16, being driven by the sprocket wheel. The tractor intermediate its ends is supported on a transverse equalizer which may be in the form of a leaf spring 18, the ends of which rest freely on the track frames 12. This construction is more or less conventional and provides for the well known three-point suspension of the tractor main frame.

Braces 20 of improved construction are disposed between the rear axle 11 and each track frame 12. Each brace is formed generally of inverted U-shape in cross section and substantially triangular in plan, having at the apex of the triangle a narrow longitudinally extending portion 21. Bracket or clamp means 22 are provided on each narrow portion 21 for pivotally attaching that end of the brace to the rear axle 11. The base of the triangle, or track frame side of the brace, is secured to the track frame 12, the construction especially providing for securing by welding, as will be described presently.

As best shown in Figures 1 and 3, the brace 20 extends diagonally inwardly and upwardly from the track frame 12 toward the rear axle 11. Generally speaking, the brace 20 may be described as having a substantially horizontal flange 23, generally triangular in plan, and having at each side edge thereof a vertical flange 24. These vertical flanges extend from the track frame 12 and converge toward the apex of the triangle, at that point being curved and extending toward the axle to reenforce the narrow portion 21. As best shown in Figure 3, the horizontal flange 23 is secured to the inner side of the track frame 12, being shown as welded thereto.

It will be apparent, of course, that the brace is wider adjacent the track frame, and this wider portion is provided with a plurality of reenforcing ribs 25 extending inwardly from the track frame 12 and terminating adjacent the narrow portion 21. These reenforcing ribs 25, together with the vertical flanges 24 and the horizontal flange 23 at the base of the brace, provide substantially spaced points for securing the brace to the track frame. The reenforcing ribs 25 provide a construction that readily adapts the brace to be secured to the track frame by welding, as at 25'.

Thus far it will be seen that a light weight brace is rigidly secured to the inner side of each track frame 12 at one end and is pivotally connected at the other end to the transverse axle 11 by the bracket 22, it being understood, of course, that any means of connecting the brace to the axle 11 may be substituted for the bracket or clamp means 22.

To further insure the rigidity of each brace, reenforcing ribs are disposed therein at points of greatest stress. A reenforcing rib 26 extends centrally throughout the brace from the narrow portion 21 to the base portion. This rib projects toward the open side of the brace and is cross-connected with the vertical flanges 24 by a reenforcing rib 27 in the vicinity of the narrow portion. Another reenforcing rib 28 cross-connects the central reenforcing rib 26 and the vertical flanges 24 in the vicinity of the connection between the brace and the track frame. This rib 28 is preferably disposed in the brace parallel to the track frame.

From the foregoing description it will be apparent that a rigid light weight torque restraining brace structure has been provided for strengthening and holding the track frames of a track type tractor. It will also be apparent that the brace is comparatively simple to manufacture, inasmuch as it is formed U-shaped in cross-section, thus eliminating any complicated casting processes. To compensate for what strength may be lost by lack of weight and to provide an advantage over conventional tubular braces, the improved brace is provided with the above mentioned reenforcing ribs. This brace has been designed primarily with strengthening thereof in view, and these ribs have been distributed in the brace at points of greatest stress, it being noted particularly that the reenforcing rib 27 cross-connects the vertical flanges 24 and the central reenforcing rib 26 in the vicinity of the beginning of the narrow portion 21. Strengthening at this point is important, inasmuch as the brace is shaped as it is to provide for the disposition of the housings containing the final drive mechanism. The other cross-connecting rib 28 is disposed parallel to the track frame and cross-connects the reenforcing ribs 25 and the central reenforcing rib 26. The rib 28, the ribs 25, and the vertical flanges 24 form a plurality of substantially box-like pockets, the ends of which are secured to the track frame. It is obvious, of course, that this construction provides for extreme rigidity at the point of connection of the brace with the track frame.

As previously mentioned, the brace was designed and the reenforcing ribs distributed to provide a rigid, light weight construction. Obviously, other ribs or means of reenforcing the brace could be provided without materially increasing the weight of the same and certainly without detracting from the strength thereof. However, it is found that the above described brace meets the requirements called for in the operation of a track type tractor even in use under adverse conditions. It will be understood, therefore, that numerous modifications and alterations are possible in the above described construction without departing from the spirit and scope of the invention as defined in the appended claims.

What is claimed as new is:

1. In a track type tractor having a main frame, a transverse axle carried thereby, and a track frame movably carried at each end of the axle at either side of the main frame, the combination with each track frame of a brace secured at one end to the track frame and extending diagonally inwardly and connected to the rear axle, said brace being formed substantially U-shaped in cross-section and tapering from its connection with the track frame to its connection with the axle, said brace including a substantially central reenforcing rib disposed therein and projecting toward the open side thereof, said rib extending substantially the length of the brace from the axle to the track frame.

2. In a track type tractor having a main frame, a transverse axle carried thereby, and a track frame movably carried at each end of the axle at either side of the main frame, the combination with each track frame of a brace secured at one end to the track frame and extending inwardly and then rearwardly and connected to the rear axle, said brace being formed substantially U-shaped in cross-section and tapering from a wider portion adjacent the track frame to a narrow portion adjacent the axle, said brace including a substantially central reenforcing rib disposed therein and projecting toward the open side thereof, said rib extending substantially the length of the brace from a point adjacent the axle in the narrow portion and downwardly therefrom to the wider portion and terminating therein.

3. In a track type tractor having a main frame, a transverse axle carried thereby, and a track frame movably carried at each end of the axle at either side of the main frame, the combination with each track frame of a brace secured at one end to the track frame and extending inwardly and then rearwardly and connected to the rear axle, said brace being formed substantially U-shaped in cross-section and tapering from a wider portion adjacent the track frame to a narrow portion adjacent the axle, said brace including a substantially central reenforcing rib disposed therein and projecting toward the open side thereof, said rib extending substantially the length of the brace from a point adjacent the axle in the narrow portion and downwardly therefrom to the wider portion and terminating therein, said wider portion being provided with a plurality of reenforcing ribs extending from a point adjacent the track frame toward the narrow portion and terminating therein.

4. In a track type tractor having a main frame, a transverse axle carried thereby, and a track frame movably carried at each end of the axle at either side of the main frame, the combination with each track frame of a brace secured at one end to the track frame and extending diagonally inwardly and connected to the rear axle, said brace being formed substantially U-shaped in cross-section and tapering from its connection with the track frame to its connection with the axle, said brace including a substantially central reenforcing rib disposed therein and projecting toward the open side thereof, said rib extending substantially the length of the brace from the axle to the track frame, and a cross rib cross-connecting the central rib and the closed sides of the brace.

5. In a track type tractor having a main frame, a transverse axle carried thereby, and a track frame movably carried at each end of the axle at either side of the main frame, the combination with each track frame of a brace secured at one end to the track frame and extending inwardly and then rearwardly and connected to the rear axle, said brace being formed substantially hollow and tapering from its connection with the track frame to its connection with the axle, said brace including a substantially central reenforcing rib disposed therein and extending substantially the length of the brace from the axle to the track frame, and a cross rib cross-connecting the central rib and the sides of the brace, said cross rib being disposed substantially intermediate the track frame and the rearwardly extending portion of the brace.

6. In a track type tractor having a main frame, a transverse axle carried thereby, and a track frame movably carried at each end of the axle at either side of the main frame, the combination with each track frame of a brace secured at one end to the track frame and extending inwardly and then curved rearwardly and connected to the rear axle, said brace being formed substantially hollow and tapering from a wider portion adjacent the track frame to a narrow portion adjacent the axle, said narrow portion beginning substantially adjacent the aforesaid curved portion, said brace including a substantially central reenforcing rib disposed therein and extending substantially the length thereof from the axle to the track frame, and a cross rib cross-connecting the central rib and the sides of the brace substantially adjacent the aforesaid curved portion for reenforcing said brace at the point of beginning of the narrow portion.

7. In a track type tractor having a main frame, a transverse axle carried thereby, and a track frame movably carried at each end of the axle at either side of the main frame, the combination with each track frame of a brace secured at one end to the track frame and extending diagonally inwardly and connected to the rear axle, said brace being formed substantially U-shaped in cross-section and tapering from its connection with the track frame to its connection with the axle, said brace including a substantially central reenforcing rib disposed therein and projecting toward the open side thereof, said rib extending substantially the length of the brace from the axle to the track frame, a cross rib cross-connecting the central rib and the closed sides of the brace and disposed substantially parallel to the track frame, and a second cross rib cross-connecting the central rib and the closed sides of the brace, being disposed between the first cross rib and the connection on the axle.

8. In a track type tractor having a main frame, a transverse axle carried thereby, and a track frame movably carried at each end of the axle at either side of the main frame, the combination with each track frame of a brace secured at one end to the track frame and extending inwardly and then curved rearwardly and connected to the rear axle, said brace being formed substantially hollow and tapering from a wider portion adjacent the track frame to a narrow portion adjacent the axle, said brace including a substantially central reenforcing rib disposed therein and extending substantially the length of the brace from the axle to the track frame, a cross rib cross-connecting the central rib and the sides of the brace and disposed in the wider portion of the brace to reenforce the brace adjacent the track frame, and a second cross rib cross-connecting the central rib and the sides of the brace, being disposed substantially adjacent the aforesaid curved portion and the beginning of the narrow portion to reenforce the brace at that point.

9. In a track type tractor having a main frame, a transverse axle carried thereby, and a track frame movably carried at each end of the axle at either side of the main frame, the combination with each track frame of a brace secured at one end to the track frame and extending diagonally inwardly and connected to the rear axle, said brace being formed substantially hollow and tapering from its connection with the track frame to its connection with the axle, said brace including a substantially central reenforcing rib disposed therein and extending substantially the length of the brace from the axle to the track frame, a cross rib cross-connecting the central rib and the sides of the brace adjacent the track frame, and a second rib cross-connecting the central rib and the closed sides of the brace between the first cross rib and the connection on the axle.

10. In a track type tractor having a main frame, a transverse axle carried thereby, and a track frame movably carried at each end of the axle at either side of the main frame, the combination with each track frame of a brace therefor, said brace being formed generally U-shaped in cross-section and substantially triangular in plan and having a portion at its apex extending longitudinally of the tractor and connected to the aforesaid axle, the brace being secured to the track frame at the base of the triangle, and a substantially centrally disposed reenforcing rib projecting toward the open side of the U and extending substantially throughout the brace from the aforesaid extending portion to the aforesaid base.

11. In a track type tractor having a main frame, a transverse axle carried thereby, and a track frame movably carried at each end of the axle at either side of the main frame, the combination with each track frame of a brace therefor, said brace being formed generally U-shaped in cross-section and substantially triangular in plan and having a portion at its apex extending longitudinally of the tractor and connected to the aforesaid axle, the brace being secured to the track frame at the base of the triangle, a substantially centrally disposed reenforcing rib projecting toward the open side of the U and extending substantially throughout the brace from the aforesaid extending portion to the aforesaid base, and a second reenforcing rib cross-connecting the central rib and the sides of the U.

12. In a track type tractor having a main frame, a transverse axle carried thereby, and a track frame movably carried at each end of the axle at either side of the main frame, the combination with each track frame of a brace therefor, said brace being formed generally U-shaped in cross-section and substantially triangular in plan and having a portion at its apex extending longitudinally of the tractor and connected to the aforesaid axle, said portion also being U-shaped in cross-section, the brace being secured to the track frame at the base of the triangle, a substantially centrally disposed reenforcing rib projecting toward the open side of the U and extending substantially throughout the brace from the aforesaid extending portion to the aforesaid base, and a second reenforcing rib cross-connecting the central rib and the sides of the U at the apex of the triangle.

13. In a track type tractor having a main frame, a transverse axle carried thereby, and a track frame movably carried at each end of said axle at either side of the main frame, the combination with each track frame of a brace disposed between the track frame and the axle and formed substantially U-shaped in cross-section and generally triangular in plan, being secured at its base to the track frame and at its apex to the axle, and a plurality of reenforcing ribs disposed in the brace and extending inwardly from the base thereof, said ribs providing with said base a plurality of spaced points for securing the brace to the track frame.

14. In a track type tractor having a main frame, a transverse axle carried thereby, and a track frame movably carried at each end of the axle at either side of the main frame, the combination with each track frame of a brace secured at one end to the track frame and extending inwardly and then rearwardly and connected to the rear axle, said brace being formed substantially U-shaped in cross-section and tapering from a wider portion adjacent the track frame to a narrow portion adjacent the axle, said brace including a substantially central reenforcing rib disposed therein and projecting toward the open side thereof, said rib extending substantially the length of the brace from a point adjacent the axle in the narrow portion and downwardly therefrom to the wider portion and terminating therein, said wider portion being provided with a plurality of reenforcing ribs extending from a point adjacent the track frame toward the narrow portion and terminating therein, said reenforcing ribs in the wider portion providing a plurality of points for weld connecting the brace to the track frame.

15. In a track type tractor having a main frame, a transverse axle carried thereby, and a track frame movably carried at each end of said axle at either side of the main frame, the combination with each track frame of a brace disposed between the axle and the track frame, said brace comprising a generally flat horizontal flange substantially triangular in plan having its base secured to the track frame and being curved to provide a narrow longitudinal extension at its apex secured to the axle, and a vertical flange at each side edge of the horizontal flange, said vertical flanges secured to and extending from the base and converging toward the apex, at that point being curved and extending toward the axle to reenforce the narrow portion, and plurality of reenforcing ribs disposed in the brace at points of greatest stress, at least one rib extending substantially centrally of the brace from the axle to the track frame.

16. In a track type tractor having a main frame, a transverse axle carried thereby, and a track frame movably carried at each end of said axle at either side of the main frame, the combination with each track frame of a brace disposed between the axle and the track frame, said brace comprising a generally flat horizontal flange substantially triangular in plan having its base secured to the track frame and being curved to provide a narrow longitudinal extension at its apex secured to the axle, and a vertical flange at each side edge of the horizontal flange, said vertical flanges secured to and extending from the base and converging toward the apex, at that point being curved and extending toward the axle to reenforce the narrow portion, and a plurality of reenforcing ribs disposed in the brace at points of greatest stress, at least one rib extending inwardly from, at an angle to and secured to the track frame.

17. In a track type tractor having a main frame, a transverse axle carried thereby, and a track frame movably carried at each end of said axle at either side of the main frame, the combination with each track frame of a brace disposed between the axle and the track frame, said brace comprising a generally flat horizontal flange substantially triangular in plan having its base secured to the track frame and being curved to provide a narrow longitudinal extension at its apex secured to the axle, and a vertical flange at each side edge of the horizontal flange, said vertical flanges secured to and extending from the base and converging toward the apex, at that point being curved and extending toward the axle to reenforce the narrow portion, and a plurality of reenforcing ribs disposed in the brace at points of greatest stress, at least one rib extending substantially centrally of the brace from the axle to the track frame, and at least one rib cross-connecting the aforesaid vertical flanges and the central rib in the vicinity of the narrow portion.

EDWARD A. JOHNSTON.
CLIFFORD R. ROGERS.
WILLIAM O. BECHMAN.